United States Patent [19]
Huber et al.

[11] 3,950,039
[45] Apr. 13, 1976

[54] TEXTILE MACHINE BEARINGS

[75] Inventors: Wolfgang Huber, Schweinfurt;
Horst G. Schrecke, Dittelbrunn, both of Germany

[73] Assignee: SKF Industrial Trading and Development Company, B.V., Plettenburgerweg, Jutphaas, Netherlands

[22] Filed: Dec. 23, 1974

[21] Appl. No.: 535,973

[30] Foreign Application Priority Data
Jan. 30, 1974 Germany.............................. 2404325

[52] U.S. Cl.................................................. 308/3 R
[51] Int. Cl.² F16C 5/00; F16C 17/00; F16C 21/00; F16C 23/02

[58] Field of Search............................ 308/3 R, 3 A

[56] References Cited
UNITED STATES PATENTS

| | | | |
|---|---|---|---|
| 3,105,723 | 10/1963 | Hamaker, Jr. | 308/3 R |
| 3,497,272 | 2/1970 | Caubet | 308/3 R |
| 3,726,571 | 4/1973 | Boyd et al. | 308/3 R |

*Primary Examiner*—Lloyd L. King
*Attorney, Agent, or Firm*—Daniel M. Rosen

[57] ABSTRACT

A guide roller construction including a sliding bearing absorbing axial and radial stresses with aero or hydro dynamic friction reduction provided by a plurality of flat grooves located in at least one surface of adjoining bearing surfaces.

13 Claims, 4 Drawing Figures

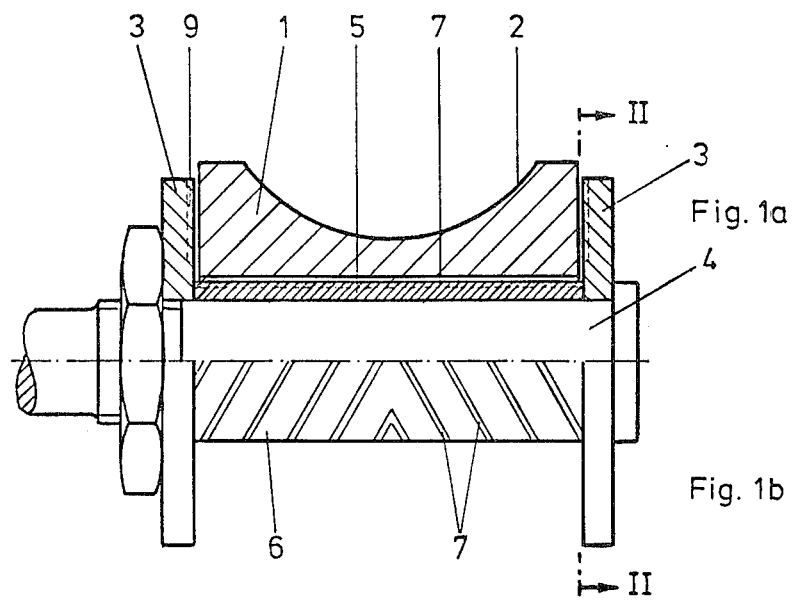
Fig. 1a
Fig. 1b
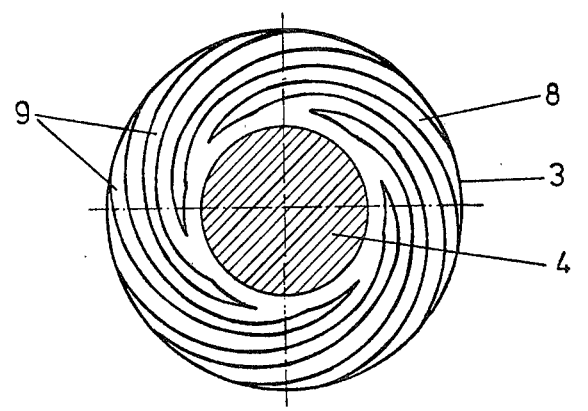
Fig. 2
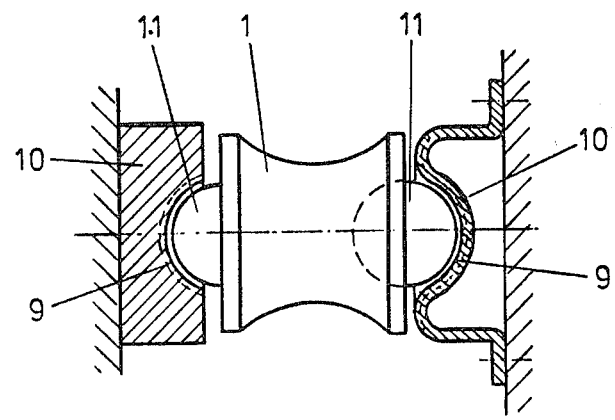
Fig. 3

TEXTILE MACHINE BEARINGS

THE INVENTION

This invention relates to guide rollers, and particularly to guide, overflow or like rollers employed in textile machines and which is supported by a sliding bearing for absorbing axial and radial stresses.

Such types of rollers as used in textile machines are conventionally usually supported by roller bearings, especially at reeling units. These roller bearings must be lubricated with grease, and the fouling of textiles being guided over the roller by leaking grease cannot always be prevented. Moreover, such rollers are relatively large due to the roller mounting and, particularly in rollers operating in heating shafts of friction texturing machines, is undesirable.

It is known from the German Public Disclosure No. 2 134 247 that a thread overflow roller may be aerostatically supported. The compressed air required for this bearing is led to the bearing surfaces by means of pressure generators via choke bores. The very narrow choke bores may easily choke up, however, leading to stoppage of the bearing and to rapid wear. It is also costly to provide pressure generating devices.

It is the object of the invention to provide a simple and troublefree bearing for rollers in textile machines in which the risk of soiling the textiles is eliminated.

The foregoing object is achieved in a guide roller, overflow roller or similar roller of the kind described by providing a sliding bearing with flat grooves for automatic production of an aero- or hydrodynamic pressure. The grooves are advantageously shaped as spiral grooves.

Such bearings require no pumps or compressors since the pressure between the bearing surfaces will build up automatically with corresponding rotational speeds of the roller. Another advantage of the invention is that with possible higher rotational speeds of the roller the output of the textile machine, as well as the service life of the bearings, can be considerably increased. The bearings require very little space and no maintenance. Additionally, the rollers according to the invention are insensitive to higher temperatures, so that, for example, they may also be used in the heating shafts of texturing machines.

In a further development of the invention the grooves are constructed in the bearing surfaces of a bolt and the radial discs connected to it. The construction of such a bearing is very simple.

Costs of production and assembly can be further reduced by constructing the sliding bearing as a spiral furrow-spherical surface bearing. This construction is advantageous when the roller has spherical zones at both front sides which are to be supported in the sheet metal cups.

Further advantages and applicabilities of the invention will be seen in the following more detailed description of embodiments shown in the drawings, wherein:

FIG. 1a shows the upper half of a longitudinal section through a roller with bearings according to the invention, FIG. 1b shows a view of the bearing surfaces shown in FIG. 1a with the roller left out, FIG. 2 shows a section along the line II — II of FIG. 1a, FIG. 3 shows a different embodiment with the roller bearings in ball-shaped cups.

FIG. 1a shows a roller 1 which, for example, can be used as a thread guide roller, transfer roller (here with cylindrical surface area) or as overflow roller in textile machines or similar types of devices. The fabric is led over the concave surface 2 of the roller 1.

Radial discs 3 are provided at both front sides of the roller 1, which discs are mounted on a bolt 4. Between the two radial discs 3 a cylindrical sleeve 5 is clamped. As can be seen in FIG. 1b, the bearing surface 6 of the sleeve 5 is provided with flat grooves 7. The grooves 7 stand at an angle to the axis in the form of arrows; or alternatively they may be screw-shaped. The bearing surfaces 8 of the two radial discs 3 are, as shown in FIG. 2, also provided with grooves which are shaped as spiral grooves 9.

At a relative rotation between the roller 1 and the bearing surfaces 6 and 8, an aerodynamic pressure builds up in the grooves 7 and in the spiral grooves 9 which serves to keep the bearings of the roller 1 free from friction. The lubricating medium, air, is automatically suctioned off from the outside during the rotation of the roller 1 and led from outside to the inside because of the shape of the grooves 7 and of the spiral grooves 9, so that a certain pressure builds up in the interior of the bearing.

In the embodiment according to FIG. 3 the roller 1 is axially and radially carried at both front sides in the ball-shaped cups 10. In a similar way as shown in FIG. 2, spiral grooves 9 are provided in the bearing surfaces of the cups 10. The roller 1 has spherical zones 11 at both front sides, which are either constructed in one piece with the roller 1 or can later be mounted on it. In this embodiment as well, pressure builds up between the spherical zones 11 and the ball cups 10 in the spiral grooves 9 at a relative movement. When air is used as the lubricating medium, this pressure is aerodynamic; however, it is also conceivable to use grease or other suitable fluid as the lubricating medium, whereby a hydrodynamic pressure is created.

FIG. 3 shows further that the ball cups 10 can be made either massive, as a solid metal block (left half of FIG. 3), or elastic from sheet metal (right half of FIG. 3).

Further alternatives, modifications and substitutions within the spirit of the invention will be apparent to those skilled in the art.

What is claimed is:

1. A roller construction comprising a roller supported by a sliding bearing which absorbs axial and radial stresses, a plurality of flat grooves in the sliding bearing surfaces of at least one of said roller and sliding bearing to define open spaces between said bearing surfaces for receiving a lubricating medium, said flat grooves being shaped at the respective bearing surface to automatically generate a dynamic pressure for reducing friction between said bearing surfaces during relative rotation of said roller and bearing surface.

2. The roller according to claim 1, wherein said grooves have a spiral shape.

3. The roller according to claim 1, wherein said grooves are formed in the bearing surfaces defined by a bolt and a plurality of radial discs connected to said bolt.

4. The roller according to claim 2, wherein said sliding bearing is formed as a spiral grooved cup-shaped bearing.

5. The roller according to claim 4, further comprising first and second spherical zones at the respective front sides of said roller, said spherical zones supported by cups made of sheet metal.

6. A guide roller construction for use in textile machinery, said guide roller including a central shaft defining a first bearing surface about the periphery thereof, said first bearing surface including a plurality of lubricant receiving flat grooves formed thereon, a guide roller member mounted for rotation about said central shaft, and first and second end members mounted at the respective sides of said guide roller member on said central shaft, each of said first and second end members defining a second bearing surface with respect to said roller member and including pluralities of lubricant receiving flat grooves formed therein on the sides of said end members facing said roller member, said first and second bearing surface grooves being shaped to automatically provide a dynamic medium pressure for reducing friction during rotation between said rotating guide roller and said first and second bearing surfaces.

7. The roller construction of claim 6, wherein said medium is aerodynamic.

8. The roller construction of claim 6, wherein said medium is hydrodynamic.

9. The roller construction of claim 6, wherein said first and second end members are disc-shaped.

10. The roller construction of claim 6, wherein said first and second end members are cup-shaped and said roller includes first and second spherical end zones.

11. The roller construction of claim 1 wherein said sliding bearing and roller are cylindrical, said flat grooves being provided only in one of said sliding bearing surfaces, said flat grooves extending at opposite angles to the axis of said cylindrical sliding bearing from the opposite ends thereof, whereby the pressure of a lubricant in said grooves builds up upon relative rotation of said roller and sliding bearing.

12. The roller construction of claim 1 wherein said sliding bearing is flat, said flat grooves comprising grooves extending spirally with respect to the rotational axis of only one of said bearing surfaces, the central portion of said sliding bearing being substantially closed whereby the pressure of a lubricant in said flat grooves builds up during relative rotation of said roller and sliding surface.

13. The roller construction of claim 1 wherein said sliding bearing comprises a cup shaped member having a closed bottom, said flat grooves extending spirally in only one of said bearing surfaces from the axis of relative rotation of said roller and sliding bearing.

* * * * *